US008865096B2

(12) United States Patent
Breton et al.

(10) Patent No.: US 8,865,096 B2
(45) Date of Patent: Oct. 21, 2014

(54) PROCESS FOR THE JOINT PRODUCTION OF SODIUM CARBONATE AND SODIUM BICARBONATE

(75) Inventors: Claude Breton, Dombasle (FR); Thoi-Dai Chau, Dombasle-sur-Meurthe (FR); Joffrey Piet, Nancy (FR)

(73) Assignee: Solvay SA, Brussels (BE)

( * ) Notice: Subject to any disclaimer, the term of this patent is extended or adjusted under 35 U.S.C. 154(b) by 12 days.

(21) Appl. No.: 13/805,005

(22) PCT Filed: Jun. 21, 2011

(86) PCT No.: PCT/EP2011/060378
§ 371 (c)(1),
(2), (4) Date: Dec. 18, 2012

(87) PCT Pub. No.: WO2011/161120
PCT Pub. Date: Dec. 29, 2011

(65) Prior Publication Data
US 2013/0095011 A1     Apr. 18, 2013

(30) Foreign Application Priority Data

Jun. 22, 2010 (EP) .................................... 10166931

(51) Int. Cl.
*C01D 7/00* (2006.01)
*C01D 7/12* (2006.01)
*C01D 7/22* (2006.01)
*C01D 7/40* (2006.01)

(52) U.S. Cl.
CPC ........ *C01D 7/00* (2013.01); *C01D 7/126* (2013.01); *C01D 7/22* (2013.01); *C01D 7/40* (2013.01)
USPC ........ 423/206.2; 423/421; 423/422; 23/302 T

(58) Field of Classification Search
None
See application file for complete search history.

(56) References Cited

U.S. PATENT DOCUMENTS

| | | |
|---|---|---|
| 3,072,466 A | 1/1963 | Bauer et al. |
| 3,264,057 A | 8/1966 | Miller |
| 3,852,427 A | 12/1974 | Hoffman et al. |
| 4,238,305 A | 12/1980 | Gancy et al. |
| 4,478,599 A | 10/1984 | Puri et al. |
| 4,584,077 A | 4/1986 | Chlanda et al. |
| 4,636,289 A | 1/1987 | Mani et al. |
| 4,654,204 A | 3/1987 | Copenhafer et al. |
| 5,624,647 A | 4/1997 | Zolotoochin et al. |
| 5,736,113 A | 4/1998 | Hazen et al. |
| 6,010,672 A | 1/2000 | Turner |
| 6,042,622 A | 3/2000 | Larsen |
| 6,221,225 B1 | 4/2001 | Mani |
| 6,660,049 B1 | 12/2003 | Day |
| 6,924,318 B2 | 8/2005 | Mischi et al. |
| 2003/0017099 A1 | 1/2003 | Kurtz |

FOREIGN PATENT DOCUMENTS

| | | |
|---|---|---|
| CA | 2009616 A1 | 8/1991 |
| EP | 0439636 A1 | 1/1990 |
| EP | 1876145 A1 | 1/2008 |
| GB | 2106488 A | 4/1983 |
| JP | 48-017160 B | 2/1973 |
| JP | 05-339005 A | 12/1993 |
| WO | WO 0179335 A1 | 10/2001 |
| WO | WO 2006053873 A1 | 5/2006 |
| WO | WO 2008003787 A1 | 1/2008 |
| WO | WO 2009087145 A1 | 7/2009 |
| WO | WO 2009087149 A1 | 7/2009 |
| WO | WO 2010072793 A1 | 7/2010 |
| WO | WO 2013092754 A1 | 6/2013 |

OTHER PUBLICATIONS

U.S. Appl. No. 12/305,444, Jean-Paul Detournay, et al, filed Dec. 18, 2008.
U.S. Appl. No. 12/811,663, Jean-Paul Detournay, et al, filed Jul. 2, 2010.
U.S. Appl. No. 12/811,643, Jean-Paul Detournay, et al, filed Jul. 2, 2010.
U.S. Appl. No. 13/139,430, Jean-Paul Detournay, et al, filed Jun. 13, 2011.
Ma, S., et al—"Study on crystallization kinetics of NaHCO3 in a new type of carbonation column and the effect of additive on the crystallization kinetics", 1996, Journal of Beijing University of Chemical Technology, vol. 23, Issue No. 3, pp. 6-13, Beijing Hua on Daxue Xuebao Bianjibu. Dept. Chem. Eng., Beijing Univ. Chem. Eng., Beijing, 100029, Peop. Rep. China; 9 pgs. Includes abstract in English.
U.S. Appl. No. 14/367,737, Piet et al.

*Primary Examiner* — Steven Bos
(74) *Attorney, Agent, or Firm* — Beatrice C. Ortego

(57) ABSTRACT

A process for the production of sodium carbonate and sodium bicarbonate out of trona, comprising crushing trona ore and dissolving it in a leaching tank containing a solution comprising sodium carbonate and sodium bicarbonate, and an additive selected from the group consisting of: phosphates, phospholipids, carboxylates, carboxylic acids, and combinations thereof, saturated in sodium bicarbonate, in order to produce solid particles suspended in a production solution comprising sodium carbonate, the solid particles containing insoluble impurities and at least 65% by weight of sodium bicarbonate. The solid particles are separated from the production solution containing sodium carbonate. At least part of the production solution containing sodium carbonate is taken out of the leaching tank.

21 Claims, No Drawings

PROCESS FOR THE JOINT PRODUCTION OF SODIUM CARBONATE AND SODIUM BICARBONATE

CROSS-REFERENCE TO RELATED APPLICATIONS

This application is a U.S. national stage entry under 35 U.S.C. §371 of International Application No. PCT/EP2011/060378 filed Jun. 21, 2011, which claims the priority benefit of European Patent application No. 10166931.5 filed on Jun. 22, 2010, this application being herein incorporated by reference in its entirety for all purposes.

TECHNICAL FIELD

This invention relates to a method for the joint production of sodium carbonate and sodium bicarbonate out of trona ore.

PRIOR ART

Trona ore is a mineral comprising sodium sesquicarbonate ($Na_2CO_3.NaHCO_3.2H_2O$). It is found in a number of deposits around the world, i.e. in USA, Brazil, China, Egypt, Kenya, India, Tanzania, Turkey. A vast deposit of mineral trona is found in southwestern Wyoming (USA) near Green River. This deposit includes beds of trona and mixed trona and halite (rock salt or NaCl) which covers approximately 2,600 km². The major trona beds range in size from less than 428 km² to at least 1,870 km². By conservative estimates, these major trona beds contain about 75 billion metric tons of ore. The different beds overlap each other and are separated by layers of shale. The quality of the trona varies depending on its particular location in the stratum.

A typical analysis of the trona ore mined in Green River is as follows:

TABLE 1

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |

The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$), as shown in the above analysis. The trona ore is processed to remove the insoluble material, the organic matter and other impurities to recover the valuable alkali contained in the trona.

The most valuable alkali produced from trona is sodium carbonate. Sodium carbonate finds major use in the glass-making industry and for the production of baking soda, detergents and paper products.

A common method to produce sodium carbonate from trona ore is known as the "monohydrate process". In that process, crushed trona ore is calcined into crude sodium carbonate which is then dissolved in water. The trona insolubles are removed, and the resulting water solution is purified and fed to a crystallizer where pure sodium carbonate monohydrate crystals are crystallized. The monohydrate crystals are separated from the mother liquor and then dried into anhydrous sodium carbonate. However, the soluble impurities contained in the trona ore, tend to accumulate into the crystallizer. To avoid build up of impurities, the mother liquor must be purged. The purge liquor, which represents important quantities for industrial monohydrate plants, is commonly sent to evaporative ponds.

On the other side, sodium bicarbonate is a product with a wide range of interesting properties and a very wide range of applications from the pharma industry to the human food and animal feed, and to the use in flue gas treatment. In flue gas treatment sodium bicarbonate is most likely among the most efficient chemicals for the removal of a wide range of pollutants (most notably the acidic one), and its use is limited only by the competition of less efficient but much cheaper chemicals such as lime or even limestone.

The production of sodium bicarbonate is currently almost entirely made by the carbonation of sodium carbonate. The carbonation may be made with $CO_2$ from lime kilns or calciners; it can also be done with geological $CO_2$.

Because of the nature of this most important process for the bicarbonate production, the price for bicarbonate is above the price of the soda ash. With such economics the uses of bicarbonate will always be limited by the competition of cheaper substitutes, most notably in the flue gas treatment.

US 2003/0017099 discloses a process for the joint production of sodium carbonate and bicarbonate, according to which solid trona is dissolved in water and the resulting water solution is fed into a monohydrate crystallizer in order to produce sodium carbonate. The purge liquor is introduced into a decahydrate crystallizer and the decahydrate crystals converted into sodium bicarbonate. It has been observed that this process is not efficient when the purge liquor, depending on the trona source, contains high levels of impurities. In particular, the sodium chloride content of the trona ore can vary depending on the precise trona vein which is exploited. High levels of sodium chloride in the purge liquor prevent smooth crystallization of decahydrate.

U.S. Pat. No. 4,654,204 discloses a process for the continuous production of purified sodium bicarbonate by introducing solid sodium carbonate, sodium sesquicarbonate, and/or Wegscheider's salt into a reversion slurry. In that process the sodium carbonate from the reversion liquor is bicarbonated with $CO_2$ in a carbonator and recycled to the reversion slurry to form sodium bicarbonate from fed sodium carbonate. The document is silent on insoluble impurities of the solid feed. The document teaches that such a reversion procedure combined with the bicarbonation step of sodium carbonate with carbon dioxide produces a purification of the solid feed and transformed into purified crystallized sodium bicarbonate.

U.S. Pat. No. 4,478,599 discloses a process for controlling the formation of crystal fines in a continuous process for crystallizing sodium bicarbonate, using carbon dioxide gas and a feeding brine comprising sodium carbonate and flocculant polymers or copolymers. The sodium bicarbonate crystallization is operated alternatively with an evaporative crystallizer, or by cooling crystallization, or by bicarbonation of the feeding brine with carbon dioxide gas. In this process the raw materials are either in liquid or gas form. The document is silent on a selective dissolution of an ore and the concomitant crystallization of sodium bicarbonate to avoid complete dissolution of the ore.

The invention aims at producing bicarbonate from trona in a smooth and inexpensive way, thereby opening new applications for the sodium bicarbonate and at the same time valorizing the sodium carbonate contained in the trona.

DETAILED DESCRIPTION OF THE INVENTION

Accordingly, the invention concerns a process for the production of sodium carbonate and sodium bicarbonate out of trona according to which:

Crushed trona ore is introduced in a leaching tank containing a dissolution solution comprising sodium carbonate and sodium bicarbonate, saturated or super-saturated in sodium bicarbonate;

An additive selected from the group consisting of: phosphates, phospholipids, carboxylates, carboxylic acids, and combinations thereof is added in the dissolution solution;

The crushed trona is at least partially dissolved in the dissolution solution in order to produce solid particles and a production solution comprising sodium carbonate, the solid particles containing insoluble impurities and at least 65% by weight of sodium bicarbonate;

The solid particles are separated from the production solution comprising sodium carbonate;

At least part of the production solution containing sodium carbonate is taken out of the leaching tank in order to constitute a produced solution comprising sodium carbonate;

Extraction water is introduced in the leaching tank.

A first advantage of the process according to the invention is the selective dissolution of sodium carbonate from the trona, enabling the separate valorization of the sodium carbonate and sodium bicarbonate parts of the trona, containing sodium sesquicarbonate, without the need of complete dissolution of the ore before processing clear solutions into sodium carbonate and sodium bicarbonate. Thereby this reduces amounts of processing water to be further evaporated.

A second advantage of the process according to the present invention is that it avoids calcining trona into raw sodium carbonate and $CO_2$ to produce sodium bicarbonate and valuable sodium carbonate therefore saving energy consumption and reducing $CO_2$ flue gas emissions per tons of sodium carbonate and bicarbonate produced.

A third advantage of the process according to the present invention is that the $CO_2$ content of the produced sodium bicarbonate is coming directly from the ore and does not need to be supplied from an outer source or recovered from existing soda ash plant.

A fourth advantage of the process according to the present invention is that the size of the solid particles which are synthesized in the leaching tank, comprising insoluble impurities and mainly sodium bicarbonate, can be adjusted according the selection of the additive and the quantity added in the dissolution solution.

A fifth advantage of the process according to the present invention is that the size selection of the synthesized solid particles produced with additives enables surprisingly the enrichment of the sodium bicarbonate content of the solid particles in particular size fraction, as this is not feasible with solid particles obtained without additives.

A sixth advantage of the process according to the present invention is that the synthesized solid particles are particularly suitable for treatment of a flue gas containing acid components: such solid particles inhibit the formation of incrustation in mills before being introduced into the flue gas. Specific pollutants of flue gases such as fluorhydric acid are effectively neutralized with such solid particles comprising insoluble impurities in combination with sodium bicarbonate.

A seventh advantage of the process according to the present invention is that the synthesized solid particles contains most of the additives added such as phosphated or carboxylated compounds that are particularly suitable as scale inhibitors when the synthesized solid particles are further used in flue gas treatment and transformed into sodic ashes that are further treated and valorized into sodium salts.

An eight advantage of the process according to the present invention is that it can be easily coupled with an electrodialysis process to either debicarbonate part of the production solution and further transform it in valuable sodium carbonate, though limiting the $CO_2$ emission per ton of soda ash produced from Trona, or to transform part of the production solution in one enriched solution in sodium bicarbonate for further production of solid sodium bicarbonate and in a second co-produced solution comprising caustic soda for further use in sodium carbonate production.

Trona contains generally at least about 10% by weight of sodium sesquicarbonate, preferably at least about 50%, more preferably at least about 80% of sodium sesquicarbonate. Trona contains generally at most about 99% by weight of sodium sesquicarbonate, more generally at most about 95% by weight of sodium sesquicarbonate. The process produces solid particles having a high content in sodium bicarbonate. Without being bound by a theoretical explanation, the inventors guess that those particles are probably produced in a two steps reaction. In the first step, the crushed trona ore is totally dissolved in the dissolution solution. In a second step, the solid particles containing sodium bicarbonate are formed spontaneously in the dissolution solution and recrystallize on and with the hydrated insoluble impurities from trona.

The process according to the invention can be operated either in a batch/discontinuous mode or in a continuous mode, as described in patent application EP2009/067813 that is incorporated by reference into the present document. In the present invention the batch/discontinuous mode is preferred to the continuous mode.

When it is operated in the batch/discontinuous mode, the composition of the dissolution solution evolves towards the composition of the production solution, as long as the quantity of trona ore initially introduced in the leaching tank is progressively dissolved and solid particles are produced. When the dissolution is completed, the solid particles are separated and extraction water is introduced to bring the composition of the solution inside the leaching tank back to the initial composition of the dissolution solution. Surprisingly the batch/discontinuous mode has shown the propensity to avoid uncontrolled nucleation observed in the continuous mode when this latter is operated in one leaching tank.

When the process is operated in a continuous mode, the composition of the dissolution solution is more or less stationary and is the same as the composition of the production solution. Extraction water and trona ore are then continuously added in the leaching tank. In a preferred mode when the process is operated in a continuous mode, at least two leaching tanks are organized in battery which operates as follows. Extraction water and trona ore are continuously added to a first leaching tank with the additives. The outflow of the first leaching tank (production solution and solid particles) is introduced into the second leaching tank. More leaching tanks can also be used in series after the second one. Such a use of two or more leaching tanks in battery enables a better residence time distribution of the trona ore within the production solution. This improves the dissolution of trona and the corresponding selective dissolution of sodium carbonate. This improves also the solid particles production with a higher content in sodium bicarbonate.

In the present invention, the additive is preferably chosen from the group consisting of: anionic hexametaphosphate, anionic polyphosphate, anionic polyphosphonate, soya lecithin, citric acid, anionic polycarboxylate polymer, anionic polyacrylate polymer, anionic polyacrylate-polyacrylamide co-polymer, and combinations thereof.

The additive chosen from the group consisting of: sodium polyacrylate polymer, ammonium polyacrylate polymer, sodium polyacrylate-polyacrylamide co-polymer, ammonium polyacrylate-polyacrylamide co-polymer, and combinations thereof, give good results. In the present invention, when the additive is chosen in this group of additives, it has advantageously a molecular weight of at least 20 000, preferably at least 30 000, more preferably at least 40 000. The additive has advantageously a molecular weight of at most 200 000, preferably at most 150 000, more preferably at most 120 000.

In the present invention, the quantity of the additive added in the dissolution solution is generally at least 0.01, preferably at least 0.06, most preferably at least 0.12 g per kilogram of the crushed trona.

The water may be selected among natural water such as filtered river water, rain water, phreatic waters, water from steam condensates and their combinations. In another embodiment, the extraction water comprises sodium carbonate and/or sodium bicarbonate. Preferably the extraction water is a recycled water solution coming from other processes in the alkali plant, preferably from electrodialysis processes. It contains preferably from 10 to 35 g/kg of sodium carbonate and/or from 70 to 100 g/kg sodium bicarbonate.

In an advantageous embodiment to produce coarse solid particles in the leaching tank, the weight ratio of extraction water to sodium sesquicarbonate of the trona introduced in the leaching tank is less than 3.5, preferably less than 3.2. The weight ratio of extraction water to sodium sesquicarbonate of the trona introduced in the leaching tank has to be adjusted according the sodium sesquicarbonate content of the trona, such as the dissolution comprising sodium carbonate and sodium bicarbonate is saturated or super-saturated in sodium bicarbonate. The produced solution comprises advantageously at least 135 g/kg sodium carbonate. A simple water balance calculation can be made by persons ordinary skilled in the art of soda ash production from trona to adjust extraction water quantity to adjust the sodium carbonate concentration, taking into account the sodium bicarbonate solubility diagram of the system: sodium carbonate, sodium bicarbonate, and water showed in FIG. 1 in the patent application EP2009/067813. The weight ratio of extraction water to sodium sesquicarbonate of the trona introduced in the leaching tank is generally at least 1.5, more generally at least 1.9, most generally at least 2.3.

Trona ore must be crushed down to a particle size suitable to get efficient dissolution of the trona in the dissolution solution. Crushing can for instance be performed in the trona mine, in the vicinity of the mining means or in the surface alkali plant. It is advantageously followed by sieving or any other separation means to eliminate too big or too small particles. Preferably, crushed trona ore is composed of particles having mean diameter D50 less than 5 mm. By diameter of trona particles is understood the equivalent diameter, that is the diameter of the sphere having the same surface as the particle. D50 is the diameter such that 50% by weight of the particles have a diameter less than D50. More preferably, the D50 diameter of the crushed trona particles is less than 2 mm. It is also recommended that the D50 diameter is at least 10 µm, preferably at least 20 µm. In some preferred embodiments, the D50 is more preferably at least 35 µm, most preferably at least 50 µm.

In order to speed up dissolution and get homogeneous solutions, it is important for the leaching tank to be properly stirred. The stirring can be performed by any means (mechanical, thermal, . . . ), suitable for inducing sufficient convection in the tank. Mechanical rotating means or vibrating means are preferred. In that case rotational speeds in excess of 50 rpm are recommended.

In the process according to the invention, the dissolution solution is saturated or slightly super-saturated in sodium bicarbonate. Slightly super-saturated in sodium bicarbonate means in present document a concentration of sodium bicarbonate above 1 up to about 35 g/kg the value of the saturation value of the aqueous solution, comprising sodium carbonate, and given by the solubility diagram showed in FIG. 1 in the patent application EP2009/067813. When the process starts, it can happen that the solution is not yet saturated in sodium bicarbonate. In that case, when trona dissolves, it is necessary that the solution becomes as quickly as possible saturated in sodium bicarbonate, to start production of the solid particles. The concentration in sodium bicarbonate at saturation depends on the concentration of other components of the solution, mainly sodium carbonate, and on the temperature. When crystallization additives are used it may happen indeed that slighter values than saturation may be reached in the dissolution solution when crystallization occurs.

It is recommended for the temperature of the dissolution and production solutions to be at least 20° C., preferably at least 25° C., more preferably at least 30° C. and most preferably at least 40° C., to speed up dissolution, and increase sensitively the particles size of the produced particles.

A temperature above 25° C. has shown surprisingly that the sizes of the produced particles can be usefully increased when residence time of the content of the leach tank is increased in continuous operation. As for a temperature below 25° C. increasing the residence time does not enable to increase the sizes of the produced particles. Coarser particles enable an easier separation of the produced particles from the production solution, and less energy consumption at the drying step.

Values of temperature of the dissolution and production solutions above 70° C. are not recommended because of excessive energy consumption. In this regard the temperature of the dissolution and production solutions is advantageously at most 65° C., more advantageously at most 60° C., and most advantageously at most 55° C.

If a low sodium bicarbonate content in the production solution is desired, temperature values below 40° C., are preferred. For instance values between 25 and 35° C. can be chosen, The produced solid particles contain insoluble impurities and at least 65%, preferably at least 70%, more preferably at least 74%, most preferably at least 85% by weight sodium bicarbonate. They contain advantageously less than 15%, preferably less than 10%, most preferably less than 5% by weight of sodium carbonate.

The insoluble impurities coming from the trona ore, such as oil shales, dolomite, feldspar, quartz, clay and shortite, in contact with the production solution are released in the leaching tank, and part of them transformed into hydrated forms. These transformed insoluble particles will be called hereafter "trona insoluble impurities". They have interesting properties in combination with the high content of sodium bicarbonate of the produced solid particles.

This is particularly the case when the produced solid particles are used in treatment of a flue gas containing acid components. Such trona insoluble impurities present the benefit to inhibit the formation of incrustation in mills when the produced solid particles are milled before to be introduced into the flue gas. Moreover specific pollutants of flue gases such as fluorhydric acid are effectively neutralized with such trona insoluble impurities in combination with sodium bicarbonate.

Therefore the present invention relates also to solid particles obtainable by the process described in present description, comprising at least 65%, preferably at least 75%, more preferably at least 85%, most preferably at least 90% by weight of sodium bicarbonate. The solid particles comprise also generally at least 2%, more generally at least 4%, most generally at least 8% by weight of trona insoluble impurities, and generally at most 26%, more generally at most 20%, and most generally at most 15% by weight of trona insoluble impurities. The solid particles contain at least 100 mg, more generally at least 200 mg, most generally at least 300 mg by weight of additives selected from the group consisting of: phosphates, phospholipids, carboxylates, carboxylic acids, and combinations thereof per kilogram of produced solid particles. The solid particles contain at most 800 mg, more generally at most 700 mg, most generally at most 600 mg by weight of additives selected from the group consisting of: phosphates, phospholipids, carboxylates, carboxylic acids, and combinations thereof per kilogram of produced solid particles.

The solid particles contain at least 100 mg, more generally at least 200 mg, most generally at least 300 mg by weight of sodium polyacrylate or sodium polyacrylate-polyacrylamide co-polymer per kilogram of produced solid particles. The solid particles contain at most 800 mg, more generally at most 700 mg, most generally at most 600 mg by weight of sodium polyacrylate or sodium polyacrylate-polyacrylamide co-polymer thereof per kilogram of produced solid particles. The solid particles contain essentially the sodium bicarbonate part of the trona ore introduced in the leaching tank, whereas the produced solution contains its sodium carbonate part. Without willing to be bound to any theory, as the trona comprising sodium sesquicarbonate does not have the same crystalline structure as sodium bicarbonate, it is believed that sodium sesquicarbonate from trona first dissolves to free sodium carbonate into the produced solution, and then sodium bicarbonate is concomitantly recrystallized partially on trona insolubles that act as seeding support to produce the solid particles. The D50 diameter of the produced solid particles is preferably at least 10 µm, more preferably at least 15 µm, and most preferably at least 20 µm.

The solid particles are then separated from the production solution containing sodium carbonate. The separation can be done on any appropriate equipment. Without being limitative, the equipment can be chosen among: decanters, rotative filters, band filters, centrifuges and their combinations. The solid particles may be washed with fresh water to remove part of the production solution containing sodium carbonate. Such washing produces washing waters that can be recycled in the leaching tank.

In an advantageous embodiment of the present invention, the solid particles separated from the production solution are further dried. The drying of the solid particles can be realized on any appropriate equipment. Advantageously the drying is operated in a fluid bed, a rotary dryer, a flash pneumatic conveyor dryer, or a gravity dryer. The final temperature of the solid particles exiting the dryer should be low enough to avoid thermal decomposition of sodium bicarbonate into sodium carbonate. In an advantageous mode, the drying of the solid particles is operated with a $CO_2$ enriched atmosphere.

This enables to transform part of the dissolved sodium carbonate, present in production solution and impregnating the solid particles, into sodium bicarbonate.

In order to increase the sodium bicarbonate content of the solid particles, in a recommended embodiment, the solid particles are submitted to a magnetic separation in order to separate and eliminate from them part of the trona insoluble impurities.

In one advantageous embodiment of the invention, the solid particles that are separated, and/or separated and dried, are further selected to constitute at least two size distribution fractions. Indeed the insoluble content of the different particle sizes distribution may vary according the size. In a particularly advantageous embodiment the dried solid particles are separated into two fractions: one coarser than 355 µm, the other one finer than 355 µm. In another particularly advantageous embodiment the finer fraction than 355 µm is further separated into two other fractions: one coarser than 40 µm the other finer than 40 µm. The extremes of particle size distribution (the finer and the coarser fractions) have a higher insoluble content than the global size distribution. Therefore in that advantageous embodiment or that another particularly advantageous embodiment, the particles of one of the at least two size fractions are further used as a mineral ore for producing refined sodium carbonate or refined sodium bicarbonate.

In the process according to the invention, the produced solution has a high content in sodium carbonate, which allows valorizing thoroughly the trona ore.

In recommended embodiments, the produced solution comprises at least 120 g/kg, advantageously at least 135 g/kg, more advantageously at least 150 g/kg sodium carbonate. Generally at least 50 weight %, more generally at least 70 w. %, and most generally at least 80 w. % of the sodium carbonate is recovered from the separation of the solid particles from the leaching tank content.

Thanks to its high content in sodium carbonate, the produced solution can be used in many different applications.

In one embodiment of the invention, at least part of the produced solution is further introduced into a crystallizer, in order to produce sodium carbonate crystals. In this embodiment it is recommended that the process according to the invention be coupled to an existing sodium carbonate monohydrate plant, to take advantage of existing monohydrate crystallizers.

In this embodiment it is also recommended that the produced solution be debicarbonated before its introduction into the crystallizer, in order to further lower its bicarbonate content. This debicarbonation can be performed for instance by vapor stripping or preferably through pH adjustment, for instance by sodium or calcium hydroxide addition.

In this embodiment, it is also advantageous that the concentration in dissolved sodium carbonate of this part of the produced solution be further increased before being introduced into the crystallizer. This can be done by an addition of calcined trona, and then optionally the impurities are removed of the calcined trona.

In this option, it is recommended that the process according to the invention be coupled to an existing sodium carbonate monohydrate plant from calcined trona, to take advantage of existing equipments to remove the impurities of the calcined trona such as for instance: size classifiers, decanters, filters, active carbon treatment units, and combinations thereof before introducing the produced solution with increased content of sodium carbonate into the monohydrate crystallizer.

In a particular embodiment of the process according to the invention, at least part of the produced solution is introduced into compartments of an electrodialyser comprising alternating less basic and more basic adjacent compartments separated from each other by cationic membranes, the more basic compartments being delimited by the anionic faces of bipolar membranes on one side and by the cationic membranes on the other side.

In this particular embodiment of the invention, the electrodialyser contains at least two types of compartments and two types of membranes, cationic and bipolar. In some embodiments it can contain additional types of compartments and anionic membranes.

A bipolar membrane is an ion exchange membrane comprising one cationic face—permeable for the cations and impermeable for the anions and another anionic face—permeable for the anions and impermeable for the cations. Such membrane can be produced by the juxtaposition of two monopolar membranes. Under a sufficient electric field, and in aqueous solution, the only possible reaction is the splitting of water at the interface between the two monopolar membranes into $H^+$ and $OH^-$ which then cross respectively the cationic and anionic monopolar membrane and exit the membrane into the adjacent compartments. It is recommended that the bipolar membranes are produced by the process as described in the patent application WO 01/79335 in the name of SOLVAY, in particular as described in its claims. The electrodialyser comprises advantageously only two types of compartments and only cationic and bipolar membranes.

In a first variant of this particular embodiment the produced solution is introduced into the less basic compartments of the electrodialyser. A solution comprising sodium bicarbonate is then extracted from those less basic compartments of the electrodialyser, this solution being afterwards able to be cooled in order to produce a suspension comprising sodium bicarbonate crystals and the suspension being separated into valorized sodium bicarbonate crystals and sodium bicarbonate mother liquor.

In this first variant of this particular embodiment according to the invention, a first production solution comprising sodium carbonate is introduced into the less basic compartments of the electrodialyser. Due to the flux of $Na^+$ ions through the cationic membrane, at least part of the entering sodium carbonate is transformed into sodium bicarbonate, forming an output solution comprising sodium bicarbonate. Depending on the concentration in sodium carbonate of the first production solution, it can also happen, in advantageous embodiments, that sodium bicarbonate is converted into carbon dioxide at the output of the less basic compartments of the cell. Indeed, when all the sodium carbonate entering the less basic compartments has been transformed into sodium bicarbonate as a consequence of $Na^+$ ions passing the cationic membranes, any additional flux of $Na^+$ ions passing through those membranes has the consequence of destroying sodium bicarbonate into $CO_2$ and water. The carbon dioxide can then be extracted from the cell and reacted with sodium carbonate solutions at other stages of the process in order to produce crystals of sodium bicarbonate. For instance, the generated $CO_2$ gas can advantageously be used to react with a sodium carbonate solution in order to produce sodium bicarbonate crystals. This reaction can be performed in gas—liquid contactors suitable for the carbonation of sodium carbonate solutions. Depending on the circumstances, the sodium carbonate solution can be first concentrated by any suitable means, before its carbonation.

In this first variant of this particular embodiment, if water is introduced into the more basic compartment, a solution comprising sodium hydroxide is then produced into the more basic compartments, by combination of the flux of sodium ions crossing the cationic membrane and the flux of hydroxyl ions crossing the anionic face of the bipolar membranes. This diluted solution of sodium hydroxide can be then used partly to debicarbonate for instance solutions from a soda ash plant or from a mine.

In a second variant of this particular embodiment, a solution comprising sodium carbonate and sodium bicarbonate is introduced into the more basic compartments of the electrodialyser. The produced solution of the process according to the invention can advantageously be used to constitute this solution. A solution comprising sodium hydroxide is then produced into the more basic compartments, by combination of the flux of sodium ions crossing the cationic membrane and the flux of hydroxyl ions crossing the anionic face of the bipolar membranes. A solution enriched in sodium carbonate is finally extracted from the more basic compartments, thanks to the reaction of sodium bicarbonate with the sodium hydroxide, that can be further valorized.

Details and particularities of the invention will appear from the description of the following examples.

Example 1

Not in Accordance with Present Claimed Invention

This is a reference example without additive added in the dissolution solution.

A quantity of 1442 g of trona T50® (whose characteristics are given in table 1), produced by SOLVAY CHEMICALS, Inc. was introduced and dissolved into a thermally conditioned leaching tank in borosilica glass of 5 liters capacity and containing 3558 g of water, equipped with a 6-pitched-blade impeller rotating at 400 rpm. The leaching tank temperature was regulated at 30° C.

The solid was introduced into the leaching tank in less than 5 minutes (batch test), and the concentration in both sodium carbonate and bicarbonate was followed versus time every 2 minutes at the beginning up to one hour time.

After 2 minutes, the dissolution solution was already saturated in sodium bicarbonate and the selective dissolution of sodium carbonate from trona progressed.

After one hour time, the concentration of the dissolution solution was stable at 136 g $Na_2CO_3$/kg and 54 g $Na_2CO_3$/kg and a mass balance showed that 99% of the sodium carbonate of trona was then dissolved, and the density of suspension of the solid particles in the slurry was 8.1% by weight.

The obtained solid particles were separated from the produced solution on a filter of 150 mm diameter, operated under 2 bars pressure and regulated at a temperature of 30° C. The solid particles were recovered and washed with ethanol on a Büchner filter equipped with laboratory fast filtration paper to remove impregnating production solution.

The sodium bicarbonate content of the solid was 62% by weight of sodium bicarbonate, 15% of sodium carbonate (mainly from impregnating dried dissolution solution) and 23% of insolubles.

The solid particles size distribution was measured on a calibrated Malvern Mastersizer S Laser particle size analyzer, using a He—Ne Laser source at 632.8 nm, a focal length of 300 mm retro diffusion optical bench (300 RF), a liquid preparing cell (Malvern MS 17), and an automatic solvent filtration kit using ethanol saturated with sodium bicarbonate.

The particle size distribution of the produced particles is reported in Table 2.

TABLE 1

| T 50 Laser granulometry | | | | T50 Chemical analysis | | | | |
|---|---|---|---|---|---|---|---|---|
| d10 (μm) | d50 (μm) | d90 (μm) | span | Na$_2$CO$_3$ (g/kg) | NaHCO$_3$ (g/kg) | Sesqui (g/kg) | Humidity (g/kg) | Insolubles (g/kg) |
| 200 | 827 | 1906 | 2.1 | 452 | 358 | 964 | 3 | 33 |

Examples 2 to 14

In Accordance with Present Claimed Invention

Different additives were tested at various concentrations for the selective dissolution of trona. The experimental equipments and procedures were identical to those described in example 1: with same trona raw material (SOLVAY T50), and same conditions at 30° C., same weight ratio of extraction water to trona (2.4 kg water/kg T50), except that different additives were added to the (extraction) water in examples 2 to 14 before the introduction of the trona and that the amount of extraction water and trona were reduced respectively to 1423 g of water and 577 g of Trona T50.

The following additives were used:

Example 2: Citric acid (Merck Company: 99.5 to 100.5% purity):

Example 3: Agar (Merck Ph. Eur.)

Example 4: Soya Lecithin (VWR-BDH-PROLABO; PGR RECTAPUR)

Example 5: Sodium Hexametaphosphate (SOLVAY INTEROX Bad-Hönningen)

Example 6: Sodium Hexametaphosphate (SOLVAY INTEROX Bad-Hönningen)

Example 7: Sodium Polyacrylate (WITTON Chem. Company Acriflow 641S) molecular weight 30000-70000 g/mol Example 8: Sodium Polyacrylate (WITTON Chem. Company Acriflow 641S)

Example 9: Sodium Polyacrylate (MAREDIS 146) molecular weight 40000-60000 g/mol

Example 10: Polyacrylic acid (SOKALAN PA 80S) molecular weight 100 000 g/mol

Example 11: Sodium polyacrylate-polyacrylamide co-polymer (SOKALAN CP5) molecular weight: 70 000 g/mol Example 12: Modified Polyacrylic acid (SOKALAN CP 13S) molecular weight 20 000 g/mol Example 13: Sodium Alkylnaphtalenesulfonate (AKZO NOBEL—PETRO AG Special)

Example 14: Sodium Alkylnaphtalenesulfonate (AKZO NOBEL—PETRO 22).

The quantities of added additive reported to the trona weight for each test are presented in Tables 2 and 3 expressed in mg of active material per kilogram of trona (mg/kg or ppm). The final produced solution composition, the solid content of the slurry and the particle size distributions of the produced particles are also presented in Tables 2 and 3.

In all the examples the dissolution rate of the sodium carbonate from trona calculated from mass balance is between 95 to 99%, except in example 6 where the dissolution rate was 88%, and corresponding in all the cases to a sodium bicarbonate content of the solid particles produced in the leaching tank of more than 70 weight percent.

The D90, D50, and D10 correspond to the particle size distribution of the solid particles such that respectively 90, 50 and 10 weight percent of the particles have a size less than the corresponding values. The span value corresponds to (D90–D10)/D50.

In example 6, where 600 mg of sodium hexametaphosphate was added, the solid particles were too coarse to be measured on the laser size particles analyzer.

As shown in Tables 2 and 3, the particle sizes of the solid particles is sensibly increased compared to the reference example, particularly the D90 and D50 when sodium hexametaphosphate, sodium polyacrylate, and sodium polyacrylate-polyacrylamide co-polymers are added to the dissolution solution. Optical microscope pictures taken of the different solid particles obtained during the test show a significant increase of individual particle sizes of the solid.

Concerning tests with citric acid, guar, and soya lecithin, the D10 and D50 values are almost unchanged. Though D90 values and observation on optical microscope have shown that the solid particles are strongly agglomerated.

Concerning tests with polyacrylic acid CP13S, and sodium alkylnaphtalene sulfonate the particle size distribution is slightly coarser or equivalent to the reference test size distribution.

Examples 15 to 19

In Accordance with Present Claimed Invention

The solid particles obtained respectively at examples 7, 8, 9, 10 and 11, using sodium polyacrylate, were further dried at room temperature 48 hours after the ethanol washing operation.

The sodium bicarbonate weight content of the solid particles obtained at examples 7, 8, 9, 10 and 11 was at least 68 w. % and at most 75 w. %. The insoluble content was between 10 and 18 w. %.

The solid particles were then sieved at two mesh sizes: 355 μm, and 40 μm. The three particles size fractions (>355 μm, between 355 and 40 μm, <40 μm) were analyzed regarding the insolubles content of each size fractions.

The results and corresponding weight fractions are presented in Table 4.

It can be seen that separating the solid particles produced in Examples 7 and 8 respectively, in different sieve size, enables to increase or decrease the insoluble content of the solid particles size fraction produced according the present invention. The coarser and finer size fractions have more insolubles, than the global size distribution. The intermediate size fraction has less insoluble content than the global size distribution.

In comparison, the obtained sodium bicarbonate with no additive at example 1 (not according the present invention) could not pass the above 355 μm and above 40 μM sieve separation and be upgraded in sodium bicarbonate content as the d90 of the product was only 30 μm. The obtained sodium bicarbonate was only 62 w. %.

The amount of sodium polyacrylate remaining in the solid particles was determined with a blank trial with pure sodium sesquicarbonate and same amount of additives added in the leaching tank according to the US Pharmacopea method for organic content in codex sodium bicarbonate. The shared proportion between the additives remaining in the sodium bicarbonate particles and the produced carbonate solution was respectively 76%+/−6% in the solid particles and 24+/−6% by weight in the production solution.

Therefore the estimated sodium polyacrylate content was about 300+/−30 mg/kg for the solid particles of example 7, and about 600+/−100 mg/kg for the solid particles of examples 8 to 11.

Should the disclosure of any patent, patent applications, and publications that are incorporated herein by reference conflict with the present description to the extent that it might render a term unclear, the present description shall take precedence.

TABLE 2

| Examples | Test number | | 1 | 2 | 3 | 4 | 5 | 6 | 7 |
|---|---|---|---|---|---|---|---|---|---|
| | Additive | | — | Citric acid | Agar | Soya Lecithin | Na HMP | Na HMP | NaPA |
| | mg/kg trona | | — | 60 | 20 | 12 | 90 | 600 | 70 |
| Produced solution analysis | Na$_2$CO$_3$ | g/kg | 136 | 135 | 135 | 137 | 134 | 117 | 135 |
| | NaHCO$_3$ | g/kg | 54 | 54 | 57 | 53 | 58 | 91 | 56 |
| | H$_2$O | g/kg | 810 | 811 | 808 | 810 | 808 | 792 | 809 |
| Slurry solid content | Weight % | | 8.1 | 6.8 | 6.4 | 7.2 | 7.1 | 5.3 | 5.0 |
| Laser particle size analysis of the solid particles | D10 | μm | 1.0 | 1.4 | 1.4 | 1.4 | 2.0 | — | 2.3 |
| | D50 | μm | 10 | 10 | 12 | 9 | 13 | — | 43 |
| | D90 | μm | 30 | 302 | 389 | 241 | 64 | — | 137 |
| | Span | / | 2.8 | 29 | 32 | 26 | 4.8 | — | 3.1 |

TABLE 3

| Examples | Test number | | 8 | 9 | 10 | 11 | 12 | 13 | 14 |
|---|---|---|---|---|---|---|---|---|---|
| | Additive | | NaPA | MA. 146 | S. PA80S | S. CP5 | S. CP13S | P. AG Special | P. 22 |
| | mg/kg trona | | 140 | 140 | 140 | 140 | 140 | 140 | 140 |
| Produced solution analysis | Na$_2$CO$_3$ | g/kg | 133 | 135 | 136 | 138 | 136 | 138 | 137 |
| | NaHCO$_3$ | g/kg | 57 | 55 | 55 | 53 | 52 | 51 | 54 |
| | H$_2$O | g/kg | 810 | 810 | 809 | 809 | 812 | 811 | 809 |
| Slurry solid content | Weight % | | 6.4 | — | — | — | — | — | — |
| Laser particle size analysis of the solid particles | D10 | μm | 2 | 2 | 2 | 2 | 2 | 2 | 1 |
| | D50 | μm | 89 | 88 | 35 | 68 | 10 | 10 | 9 |
| | D90 | μm | 236 | 470 | 514 | 519 | 30 | 58 | 42 |
| | Span | / | 2.6 | 5.3 | 14 | 8 | 2.8 | 5.6 | 4.6 |

TABLE 4

| | Sieved fractions | Weight fraction (%) | Insoluble content of the fraction (g/kg) | Global insoluble content of the fraction (g/kg) |
|---|---|---|---|---|
| Example 15 | Solid particles from Example 7 | | | 99 |
| | >355 μm | 15 | 267 | |
| | 355 μm > ⌀ > 40 μm | 75 | 58 | |
| | <40 μm | 10 | 167 | |
| Example 16 | Solid particles from Example 8 | | | 127 |
| | >355 μm | 25 | 230 | |
| | 355 μm > ⌀ > 40 μm | 70 | 63 | |
| | <40 μm | 5 | 496 | |
| Example 17 | Solid particles from Example 9 | | | 193 |
| | >355 μm | 32 | 419 | |
| | 355 μm > ⌀ > 40 μm | 62 | 82 | |
| | <40 μm | 6 | 336 | |
| Example 18 | Solid particles from example 10 | | | 147 |
| | >355 μm | 24 | 284 | |
| | 355 μm > ⌀ > 40 μm | 67 | 96 | |
| | <40 μm | 10 | 171 | |
| Example 19 | Solid particles from example 11 | | | 176 |
| | >355 μm | 43 | 262 | |
| | 355 μm > ⌀ > 40 μm | 52 | 107 | |
| | <40 μm | 4 | 162 | |

The invention claimed is:

1. A process for the production of sodium carbonate and sodium bicarbonate out of crushed trona ore, said process comprising:
   introducing crushed trona in a leaching tank containing a dissolution solution comprising sodium carbonate and sodium bicarbonate, saturated or super-saturated in sodium bicarbonate;
   adding an additive selected from the group consisting of: phosphates, phospholipids, carboxylates, carboxylic acids, and combinations thereof to said dissolution solution;
   at least partially dissolving said crushed trona in said dissolution solution in order to produce solid particles and a production solution comprising sodium carbonate, said solid particles containing trona insoluble impurities and at least 65% by weight of sodium bicarbonate;
   separating said solid particles from said production solution comprising sodium carbonate; and
   taking at least a part of said production solution containing sodium carbonate out of said leaching tank in order to constitute a produced solution comprising sodium carbonate.

2. The process according to claim 1, wherein said additive is selected from the group consisting of: anionic hexametaphosphate, anionic polyphosphate, anionic polyphosphonate, soya lecithin, citric acid, anionic polycarboxylate polymer, anionic polyacrylate polymer, anionic polyacrylate-polyacrylamide co-polymer, and combinations thereof.

3. The process according to claim 2, wherein said additive is selected from the group consisting of: sodium polyacrylate polymer, ammonium polyacrylate polymer, sodium polyacrylate-polyacrylamide co-polymer, ammonium polyacrylate-polyacrylamide co-polymer, and combinations thereof.

4. The process according to claim 3, wherein said additive has a molecular weight of at most 200 000.

5. The process according to claim 2, wherein the quantity of said additive added in said dissolution solution is at least 0.01 g per kilogram of said crushed trona.

6. The process according to claim 1, wherein said produced solution comprises at least 135 g/kg sodium carbonate.

7. The process according to claim 1, wherein said solid particles separated from said production solution are further dried.

8. The process according to claim 1, wherein said solid particles contain at least 70% by weight sodium bicarbonate.

9. The process according to claim 1, wherein said solid particles have a mean diameter D50 of at least 9 μm.

10. The process according to claim 3, wherein said solid particles have a mean diameter D50 of at least 20 μm.

11. The process according to claim 2, wherein said solid particles, that are separated, and/or separated and dried, are further selected to constitute two size distribution fractions.

12. The process according to claim 11, wherein said particles of one of the two size fractions are further used as a mineral ore for producing refined sodium carbonate or refined sodium bicarbonate.

13. The process according to claim 1, wherein at least part of said produced solution is debicarbonated and introduced into a crystallizer, in order to produce sodium carbonate crystals.

14. The process according to claim 1, wherein:
   at least part of said produced solution is introduced into less basic compartments of an electrodialyser comprising alternating less basic and more basic adjacent compartments separated from each other by cationic membranes, the more basic compartments being delimited by anionic faces of bipolar membranes on one side and by cationic membranes on the other side; and
   a solution comprising sodium bicarbonate is extracted from the less basic compartments of the electrodialyser, this solution being afterwards cooled in order to produce a suspension comprising sodium bicarbonate crystals, and said suspension being separated into valorized sodium bicarbonate crystals and a sodium bicarbonate mother liquor.

15. Solid particles comprising at least 68% by weight of sodium bicarbonate, at least 2% by weight of trona insoluble impurities, and at least 100 ppm of an additive selected from the group consisting of phosphates, phospholipids, carboxylates, carboxilic acids, and combinations thereof.

16. The process according to claim 4, wherein said additive has a molecular weight of at least 20,000.

17. The process according to claim 5, wherein the quantity of said additive added in said dissolution solution is at least 0.06 g per kilogram of said crushed trona.

18. The process according to claim 1, being operated in a batch/discontinuous mode.

19. The process according to claim 1, further comprising introducing an extraction water in said leaching tank, wherein the weight ratio of said extraction water introduced in said leaching tank to sodium sesquicarbonate contained in said crushed trona is less than 3.5.

20. The process according to claim 1, wherein said solid particles comprise at least 2% by weight of said trona insoluble impurities.

21. A process for the production of sodium carbonate and sodium bicarbonate out of crushed trona ore, said process comprising:
   introducing crushed trona in a leaching tank containing a dissolution solution comprising sodium carbonate and sodium bicarbonate, saturated or super-saturated in sodium bicarbonate;
   adding an additive selected from the group consisting of: phosphates, phospholipids, carboxylates, carboxylic acids, and combinations thereof to said dissolution solution;
   at least partially dissolving said crushed trona in said dissolution solution in order to produce solid particles and a production solution comprising sodium carbonate, said solid particles containing trona insoluble impurities and at least 65% by weight of sodium bicarbonate;
   separating said solid particles from said production solution comprising sodium carbonate; and
   taking at least a part of said production solution containing sodium carbonate out of said leaching tank in order to constitute a produced solution comprising sodium carbonate,
wherein said solid particles, which are separated and optionally dried, comprise a particle size distribution, and are further selected to constitute two size distribution fractions, one of said two size distribution fractions comprising a higher content in said trona insoluble impurities than the entire particle size distribution, and wherein said size distribution fraction comprising a higher content in trona insoluble impurities is a sieved fraction of particle sizes greater than 355 microns or a sieved fraction of particle sizes less than 40 microns.

* * * * *